US010185566B2

(12) United States Patent
Naveh et al.

(10) Patent No.: US 10,185,566 B2
(45) Date of Patent: Jan. 22, 2019

(54) MIGRATING TASKS BETWEEN ASYMMETRIC COMPUTING ELEMENTS OF A MULTI-CORE PROCESSOR

(75) Inventors: Alon Naveh, Ramat Hasharon (IL); Yuval Yosef, Hadera (IL); Eliezer Weissmann, Haifa (IL); Anil Aggarwal, Portland, OR (US); Efraim Rotem, Haifa (IL); Avi Mendelson, Haifa (IL); Ronny Ronen, Haifa (IL); Boris Ginzburg, Haifa (IL); Michael Mishaeli, Zichron Yaakov (IL); Scott D. Hahn, Hillsboro, OR (US); David A. Koufaty, Portland, OR (US); Ganapati Srinivasa, Portland, OR (US); Guy Therien, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 13/994,142

(22) PCT Filed: Apr. 27, 2012

(86) PCT No.: PCT/US2012/035339
§ 371 (c)(1),
(2), (4) Date: Jun. 14, 2013

(87) PCT Pub. No.: WO2013/162589
PCT Pub. Date: Oct. 31, 2013

(65) Prior Publication Data
US 2014/0129808 A1    May 8, 2014

(51) Int. Cl.
*G06F 9/30*    (2018.01)
*G06F 9/48*    (2006.01)
*G06F 9/50*    (2006.01)

(52) U.S. Cl.
CPC ........ *G06F 9/30145* (2013.01); *G06F 9/4856* (2013.01); *G06F 9/5094* (2013.01);
(Continued)

(58) Field of Classification Search
CPC ... G06F 9/30145; G06F 9/5094; G06F 9/4856
See application file for complete search history.

(56) References Cited

U.S. PATENT DOCUMENTS

| 5,163,153 A | 11/1992 | Cole et al. |
| 5,307,485 A * | 4/1994 | Bordonaro ............... G06F 7/32 |

(Continued)

FOREIGN PATENT DOCUMENTS

| EP | 1 282 030 A1 | 5/2003 |
| EP | 1715405 | 10/2006 |
| KR | 10-2004-0091211 | 10/2004 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
(Continued)

*Primary Examiner* — Benjamin P Geib
*Assistant Examiner* — William V Nguyen
(74) *Attorney, Agent, or Firm* — Trop, Pruner & Hu, P.C.

(57) ABSTRACT

In one embodiment, the present invention includes a multicore processor having first and second cores to independently execute instructions, the first core visible to an operating system (OS) and the second core transparent to the OS and heterogeneous from the first core. A task controller, which may be included in or coupled to the multicore processor, can cause dynamic migration of a first process scheduled by the OS to the first core to the second core transparently to the OS. Other embodiments are described and claimed.

19 Claims, 10 Drawing Sheets

(52) U.S. Cl.
CPC ...... *G06F 2209/5018* (2013.01); *Y02D 10/22* (2018.01); *Y02D 10/24* (2018.01); *Y02D 10/32* (2018.01)

(56) References Cited

U.S. PATENT DOCUMENTS

| | | | |
|---|---|---|---|
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 8,219,788 B1* | 7/2012 | Cheng | G06F 9/455 712/225 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0188372 A1 | 8/2005 | Inoue et al. | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2008/0281476 A1* | 11/2008 | Bose | G05D 23/1932 700/300 |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodes et al. | |
| 2009/0172375 A1 | 7/2009 | Rotem et al. | |
| 2009/0172428 A1 | 7/2009 | Lee | |
| 2009/0182980 A1* | 7/2009 | Raghavareddy | G06F 9/321 712/202 |
| 2009/0187912 A1 | 7/2009 | Lee | |
| 2009/0222654 A1* | 9/2009 | Hum | G06F 13/24 713/100 |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0162023 A1* | 6/2010 | Rotem | G06F 1/3203 713/340 |
| 2010/0191997 A1 | 7/2010 | Dodeja et al. | |
| 2010/0332909 A1* | 12/2010 | Larson | G06F 11/3476 714/40 |
| 2011/0154090 A1 | 6/2011 | Dixon et al. | |
| 2011/0314480 A1* | 12/2011 | Chinya | G06F 9/3009 718/108 |
| 2011/0320766 A1* | 12/2011 | Wu | G06F 9/30076 712/28 |
| 2012/0072920 A1* | 3/2012 | Kawamura | G06F 9/30123 718/108 |
| 2012/0079235 A1* | 3/2012 | Iyer | G06F 9/5027 712/30 |
| 2012/0079290 A1 | 3/2012 | Kumar | |
| 2012/0159123 A1* | 6/2012 | Naffziger | G06F 1/3243 712/37 |
| 2012/0233477 A1* | 9/2012 | Wu | G06F 1/3287 713/320 |
| 2012/0246506 A1 | 9/2012 | Knight | |
| 2013/0007494 A1* | 1/2013 | Branover | G06F 1/3203 713/323 |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |

OTHER PUBLICATIONS

SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.
International Application No. PCT/US2012/028876, filed Mar. 13, 2012, entitled "Dynamically Computing an Electrical Design Point (EDP) for a Multicore Processor," by Intel Corporation.

(56) References Cited

OTHER PUBLICATIONS

U.S. Appl. No. 13/600,568, filed Aug. 31, 2012, entitled, "Configuring Power Management Functionality in a Processor," by Malini K. Bhandaru, et al.
Nvidia, "Whitepaper; Variable SMP—A Multi-Core CPU Architecture for Low Power and High Performance," 2011, 16 pages.
Philip M. Wells, et al., "Dynamic heterogeneity and the Need for Multicore Virtualization," 2009, 10 pages.
Rakesh Kumar, et al., "Single-ISA Heterogeneous Multi-Core Architectures: The Potential for Processor Power Reduction," Dec. 2003, 12 pages.
Arm, "Whitepaper; Big.Little Processing with ARM Cortex—A15 & Cortex-A7," Sep. 2011, 8 pages.
International Searching Authority, "Notification of Transmittal of the International Search Report and the Written Opinion of the International Searching Authority," dated Dec. 20, 2012 in International application No. PCT/US2012/035339.

\* cited by examiner

MIGRATING TASKS BETWEEN ASYMMETRIC COMPUTING ELEMENTS OF A MULTI-CORE PROCESSOR

TECHNICAL FIELD

Embodiments relate to migration of tasks in a multicore processor.

BACKGROUND

Modern processors are often implemented with multiple cores. Typically, all of these cores are of a homogenous nature. That is, each core is of an identical design and thus has an identical layout, implements the same instruction set architecture (ISA), and so forth. In turn, an operating system (OS) of a system including the processor can select any of these multiple cores to handle tasks.

As time progresses, processors are being introduced with heterogeneous resources. Oftentimes these resources are specialized accelerators to perform specialized tasks. However, it is anticipated that processors will be introduced that include heterogeneous cores that have different characteristics. An OS that is designed for a symmetric system cannot be used with such a processor without additional hardware or software support to hide differences between the cores.

DETAILED DESCRIPTION

Figure 1:
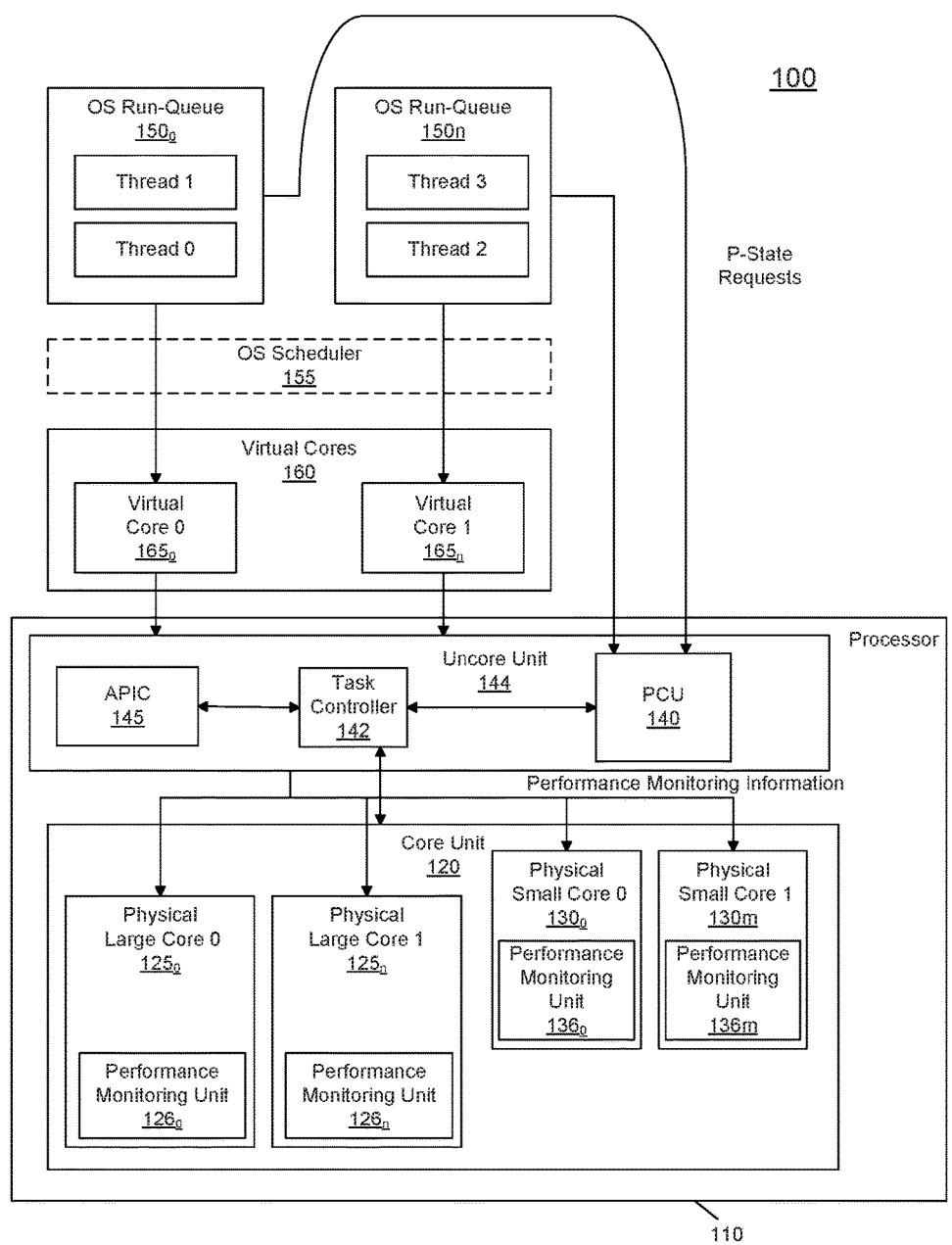
FIG. 1 is a block diagram of a system arrangement in accordance with an embodiment of the present invention.

In various embodiments a multicore processor can include heterogeneous resources including cores having heterogeneous capabilities, for example, with the same instruction set architectures (ISAs) but having differing performance capabilities or even different ISAs. Furthermore, the heterogeneous nature of these resources can be maintained transparently to an operating system (OS). To this end, embodiments provide a mechanism that can be implemented in a very lightweight manner, leveraging information and logic present in a given processor to control allocation of tasks to the different resources transparently to the OS. In this way, embodiments can take advantage of the features of the different resource types to efficiently perform instructions with reduced power consumption and improved execution speeds. Embodiments are directed to processor architectures and hardware support that provide for resources to be used transparently to an operating system, and thus avoid the need to enable a heterogeneous processor or other resource to be supported by the operating system or hypervisor.

By integrating cores with different performance capabilities such as large cores having high single thread performance and small cores having higher power efficiency, overall power efficiency of a processor can be increased without sacrificing performance. This processor can be an asymmetric multiprocessor, namely an OS-transparent asymmetric multiprocessor (AMP) system, details of which are described below. In various embodiments having such a heterogeneous architecture, control between the cores can be realized without OS support in a system in which the OS assumes that all cores are equal. Embodiments may further enable fast, transparent (to OS) switch of code execution between the different types of cores.

In various embodiments, only a single core type can be exposed to the OS, which may be a legacy OS, with one or more other core types present in the processor remaining completely hidden from the OS. Although described as cores, understand that in various embodiments other processing engines such as fixed function units, graphics units, physics units and so forth may also be transparent to the OS. For purposes of discussion, assume that the large core type is exposed to the OS. Accordingly, the OS schedules processes to one or more of these large cores. The re-assignment of processes to the transparent cores, and related to it process migration between cores, can be done leveraging information readily available in the processor, such as performance state information and/or performance monitoring information received in a task controller of the processor, also referred to herein as a task control unit. Note that as used herein, a process migration may generally refer to migration of an execution context between cores or other resources.

In one embodiment, this task controller may be a separate logic or unit of the processor, and can be used to migrate processes between cores transparently to the OS. In other embodiments, this task controller may be combined and incorporated with a power control unit or other power controller of the processor. However, these units may logically be different in that the task controller receives inputs from the power control unit, performance counters, and so forth, and makes a decision on thread migration. As such, the task controller acts more like a micro-scheduler than a power controller. In various embodiments, the task controller can cause assignment of tasks to physical cores, thus maintaining transparency of the actual hardware structure with respect to the OS. In some embodiments, the task controller can be configured to communicate with an advanced programmable interrupt controller (APIC) of the processor to thus provide virtualization between a virtual core to which the OS allocates a task and a physical core on which the task is actually executing. To this end, in some embodiments the APIC can receive process allocations from the OS which include a core identifier (which in some embodiments can be in the form of an APIC ID) and initially assign the task using an APIC ID-to-core ID mapping table to a core visible to the OS, e.g., a large core. Then, the task controller can cause a migration of this process to a core that is not visible to the OS, e.g., a small core and reflect the switch by interfacing with the APIC to update the mapping table of the APIC. Thus the task controller may replace under the hood the physical core that the OS controls. As part of this replacement, the task controller can update the APIC mapping in order to hide from the OS the fact that the physical cores were replaced.

Although the scope of the present invention is not limited in this regard, in some embodiments the task controller can cause a process migration between cores mainly based on following factors: operating system performance requests, performance monitoring information, and availability of physical resources like power and thermal. Note that the task controller can stop a process execution on one core and migrate it to another physically different core at any time during a process life.

Referring now to FIG. 1, shown is a block diagram of a system arrangement in accordance with an embodiment of the present invention. As shown in FIG. 1, system 100 includes a processor 110 which can be a multicore processor that includes a core unit 120 having heterogeneous resources such as cores physically disparate in size and available resources. Specifically in the embodiment of FIG. 1, different types of hardware or physical cores can be present, including a plurality of so-called large cores $125_0$-$125_n$ (generically large core 125), and a plurality of so-called small cores $130_0$-$130_m$, (generically small core 130) (note that different numbers of large and small cores may be present). In many embodiments, these different core types can be of the same ISA but having performance differences such as by way of different micro-architectures such as a larger, out-of-order core type and a smaller, in-order core type.

Note however that in still other embodiments, the heterogeneous cores can be of different ISAs such as a given instruction set architecture and a subset of this instruction set architecture. For example, large cores 125 can execute all instructions of an ISA, while small cores 130, which may have a lesser number of architectural and micro-architectural resources including different/smaller register structures, execution units and so forth, can only execute a subset of the ISA. In this way, the different ISAs can partially overlap. In other embodiments, the ISAs to be handled by the different core types can be completely different. In cases where the ISAs are different, non-supported instructions can be executed on a core by an emulation engine, or can instead be handled by issuing a fault which can cause a migration back to a supporting core.

As further seen in FIG. 1, processor 110 further includes an uncore unit 144 with various components, representative ones of which are shown in FIG. 1. As seen, uncore unit 144 includes a power controller 140, also referred to herein as a power control unit (PCU). In various embodiments PCU 140 may be a hardware-based logic that can perform power management and control for the processor. Processor 110 can operate in one of multiple performance states. In one embodiment, an OS can issue a request to change a performance state or so-called P-state of a core via a request to a PCU 140. In turn responsive to this request, the PCU can communicate a performance state with a task controller or task control unit (TCU) 142. Along with additional information such as performance monitoring information from the cores, TCU 142 can trigger an asynchronous interrupt to enable an OS transparent migration between different core types. Similar migrations can occur due in part to performance state information received in TCU 142 from PCU 140.

Note that the performance states can be according to an OS-based mechanism, namely the Advanced Configuration and Platform Interface (ACPI) standard (e.g., Rev. 3.0b, published Oct. 10, 2006). According to ACPI, a processor can operate at various power and performance states or levels. With regard to power states, ACPI specifies different power consumption states, generally referred to as so-called C1 to Cn states. When a core is active, it runs at a so-called C0 state, and when the core is idle it may be placed in a core low power state, a so-called core non-zero C-state (e.g., C1-C6 states). In addition to these power states, a processor can further be configured to operate at one of multiple performance states, namely from P0 to PN. In general, the P1 performance state may correspond to the highest guaranteed performance state that can be requested by an OS. In general the different P-states correspond to different operating frequencies at which a core can run.

Note that the P-state control can be more finely controlled than on a processor-wide basis. In different embodiments, each core (or even portion of the core) can operate at independent performance levels and accordingly, one or more cores or portions thereof can be considered to be an independent performance domain.

Increasing the performance or efficiency of code execution can be defined by minimizing the amount of time that it takes to complete a defined amount of work. Increasing the performance efficiency mostly causes consumption of more power, while saving power typically has a negative effect on the performance efficiency.

Increasing the power/performance efficiency of code execution can be defined by minimizing the ratio between the energy that is consumed to complete a defined amount of work and the execution time that it takes to execute this work. For example saving power but still executing the same amount of work or minimizing the time to execute the same amount of work without increasing the power consumption increases the power/performance efficiency. Embodiments may be used to increase the power/performance efficiency.

FIG. 1 also shows the presence of APIC 145 that may receive various incoming interrupts, both from the OS as well as hardware-based interrupts and map such interrupts to a requested core. Furthermore, in accordance with an embodiment of the present invention, dynamic remapping can occur based on control from TCU 142 such that the TCU can dynamically migrate threads between the asymmetric cores transparently to the OS. Note that in some implementations may provide a distributed APIC architecture such that an APIC may be present in each core, with a central APIC unit present, e.g., in the PCU/TCU.

As further shown in FIG. 1, the OS may further provide P-state requests directly to PCU 140, which can provide such information to TCU 142 to perform dynamic migrations in accordance with an embodiment of the present invention. As further seen, TCU 142 may also receive incoming performance monitoring information from corresponding performance monitoring units $126_0$-$126_n$ and $136_0$-$136_m$ of the cores.

Incoming thread allocations from the OS are made to a given virtual core that can either be a large or small core depending upon the implementation. In general, only one type of core is visible to the OS. Note that switching of processes between the different cores can be done much faster (and at higher frequencies) than an OS context switch. For example, an OS-triggered context switch can occur approximately one per millisecond (ms), while hardware-triggered context switches can occur within several tens of microseconds (μs).

As further seen in FIG. 1, a software view of system 100 is also provided. Specifically, system 100 can execute an OS that is designed for a symmetric processor and can be used with processor 110 although the processor is of an asymmetric design. This asymmetry can be hidden from the OS via task controller 142 using mechanisms as described herein by enabling the OS to control only a single core type, and by making only single types of cores visible for the OS control.

As seen, the software portion of system 100 can include multiple OS run queues $150_0$-$150_n$ (generically run queues 150). Each queue can include multiple threads, e.g., scheduled by an OS scheduler 155. As seen, OS scheduler 155 has a view of the hardware of processor 110 as having virtual cores 160 that include virtual large cores $165_0$-$165_n$, e.g., corresponding to large cores $125_0$-$125_n$. That is, the small cores remain transparent to the OS. Note that in other implementations, the OS may have a virtual view of the small cores and the large cores can remain transparent to the OS. In general, the OS will enumerate only a single type of core. Without loss of generality the examples described herein assume two different die size of core type, with or without the same ISA support. Embodiments may also include a processor including two or more types of cores, while the difference between the cores may not necessarily be the die size of the cores or the group of ISA that each core supports.

Using the arrangement in FIG. 1, the software provides threads to be executed within processor 110. More specifically, via OS scheduler 155 threads, e.g., 0 and 1 of OS run queue $150_0$, can be scheduled to virtual core $165_0$, which the OS associates with large core $125_0$ and the threads 2 and 3 of run queue $150_n$ can be scheduled to virtual core $165_n$, which the OS associates with large core $125_n$. Although shown with this particular implementation in the embodiment of FIG. 1, understand the scope of the present invention is not limited in this regard.

Figure 2:
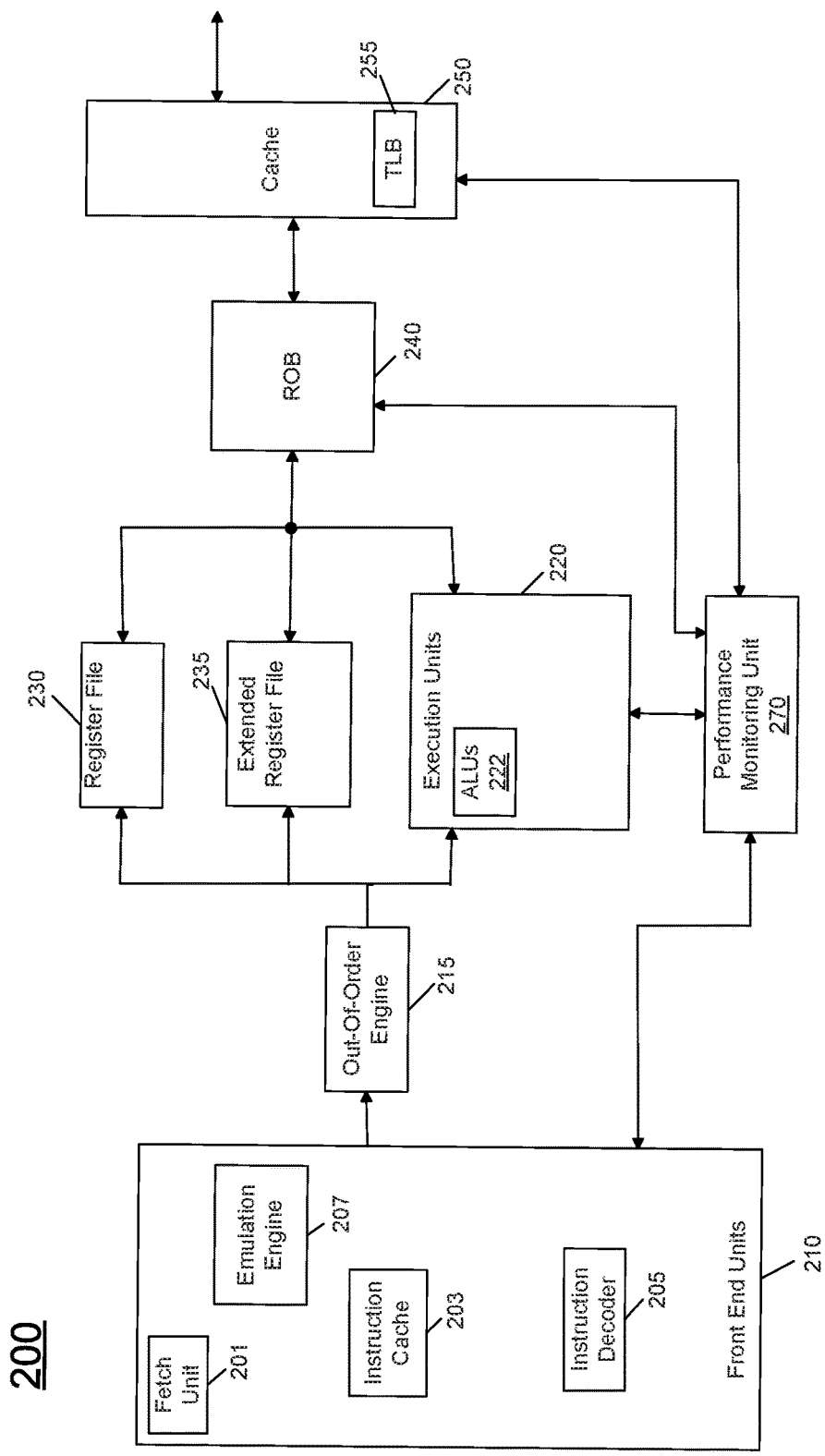
FIG. 2 is a block diagram of a processor core in accordance with one embodiment of the present invention.

Embodiments can be implemented in many different processor types. For example, embodiments can be realized in a processor such as a multicore processor. Referring now to FIG. 2, shown is a block diagram of a processor core in accordance with one embodiment of the present invention. As shown in FIG. 2, processor core 200 may be a multi-stage pipelined out-of-order processor. Processor core 200 is shown with a relatively simplified view in FIG. 2 to illustrate various features used in connection with dynamic hardware context switching in accordance with an embodiment of the present invention.

As shown in FIG. 2, core 200 includes front end units 210, which may be used to fetch instructions to be executed and prepare them for use later in the processor. For example, front end units 210 may include a fetch unit 201, an instruction cache 203, and an instruction decoder 205. In some implementations, front end units 210 may further include a trace cache, along with microcode storage as well as a micro-operation storage. Fetch unit 201 may fetch macro-instructions, e.g., from memory or instruction cache 203, and feed them to instruction decoder 205 to decode them into primitives such as micro-operations for execution by the processor. Front end units 210 may further include an emulation engine 207 that can receive incoming instructions that are not supported by the underlying ISA of the core and emulate them, e.g., via binary translation or in another manner, to thus provide emulated instructions to the pipeline to enable their execution within a non-supported core.

Coupled between front end units 210 and execution units 220 is an out-of-order (OOO) engine 215 that may be used to receive the micro-instructions and prepare them for execution. More specifically OOO engine 215 may include various buffers to re-order micro-instruction flow and allocate various resources needed for execution, as well as to provide renaming of logical registers onto storage locations within various register files such as register file 230 and extended register file 235. Register file 230 may include separate register files for integer and floating point operations. Extended register file 235 may provide storage for vector-sized units, e.g., 256 or 512 bits per register.

Various resources may be present in execution units 220, including, for example, various integer, floating point, and single instruction multiple data (SIMD) logic units, among other specialized hardware. For example, such execution units may include one or more arithmetic logic units (ALUs) 222.

When operations are performed on data within the execution units, results may be provided to retirement logic, namely a reorder buffer (ROB) 240. More specifically, ROB 240 may include various arrays and logic to receive information associated with instructions that are executed. This information is then examined by ROB 240 to determine whether the instructions can be validly retired and result data committed to the architectural state of the processor, or whether one or more exceptions occurred that prevent a proper retirement of the instructions. Of course, ROB 240 may handle other operations associated with retirement.

As shown in FIG. 2, ROB 240 is coupled to cache 250 which, in one embodiment may be a low level cache (e.g., an L1 cache) and which may also include TLB 255, although the scope of the present invention is not limited in this regard. From cache 250, data communication may occur with higher level caches, system memory and so forth. Also shown in FIG. 2 is a performance monitoring unit 270, which can monitor execution in the core, e.g., via a set of counters that can be programmably configured to count various events and report results to a variety of locations, including a TCU for purposes of dynamic context switching in accordance with an embodiment of the present invention (not shown in FIG. 2 for ease of illustration).

Note that while the implementation of the processor of FIG. 2 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry. Also understand that the core of FIG. 2 may be a large core, and a lesser number of components, widths, and so forth may be present in the small cores.

Figure 3:
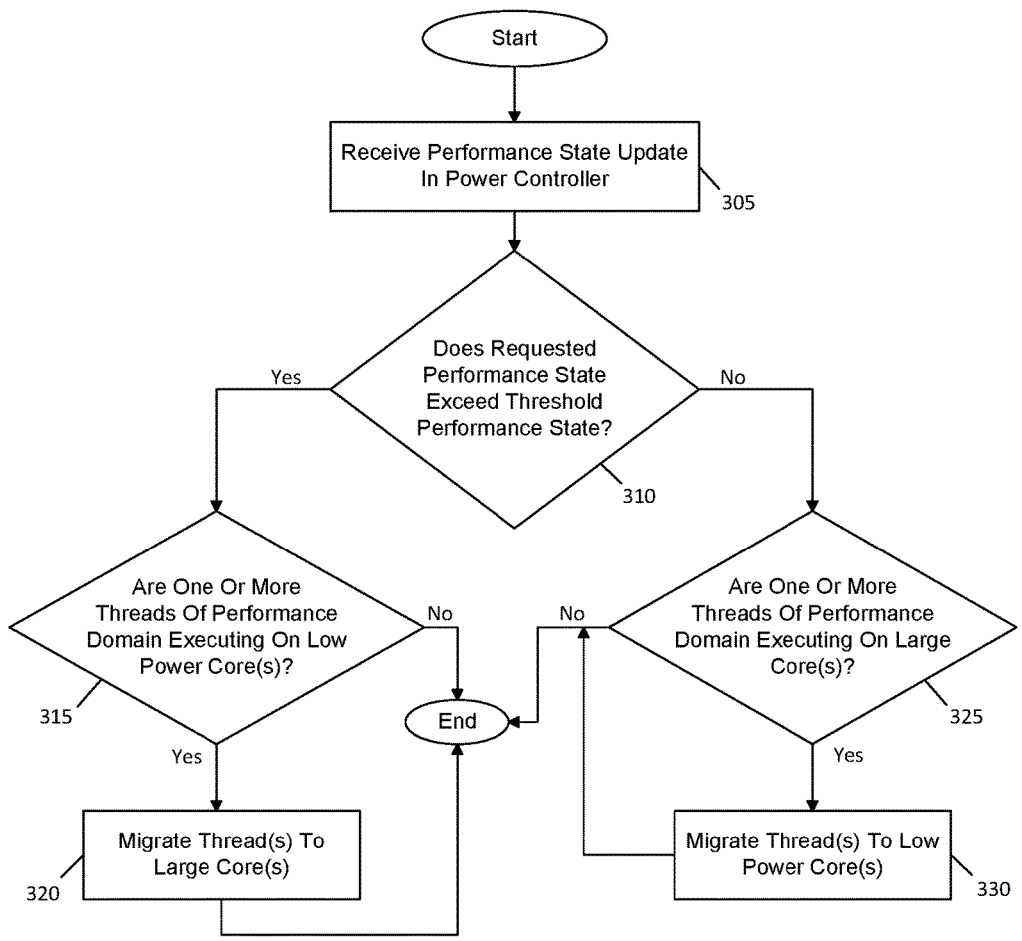
FIG. 3 is a flow diagram of a method for dynamically migrating threads in accordance with an embodiment of the present invention.

Referring now to FIG. 3, shown is a flow diagram of a method in accordance with an embodiment of the present invention. In one embodiment, method 300 may be implemented by logic within a TCU to dynamically control migration of one or more threads between different core types based performance state updates received in the TCU. As seen, method 300 may begin by receiving a P-state update in a power control unit (block 305). For example, a P-state update can be received from the OS, e.g., based on the OS's analysis of code execution. As an example, the P-state update request can be a request to increase the performance state or decrease the performance state from a current level. In turn, the PCU can provide this request to the TCU.

Still referring to FIG. 3, control passes to diamond 310 where it can be determined whether the requested performance state exceeds a threshold performance state. Although the scope of the present invention is not limited in this regard, in one embodiment this threshold performance state may correspond to a maximum guaranteed operating frequency, e.g., a P1 state. If a higher state is requested, the determination is in the affirmative and accordingly, control passes to diamond 315.

At diamond 315 it can be determined whether one or more threads within a performance domain are executing on a low power core. This analysis can be done on a per performance domain basis. That is, in some embodiments a processor can be configured to have multiple performance domains such that each domain can operate at an independent performance state (e.g., a different performance state, and corresponding voltage and operating frequency). As an example, an AMP processor can be configured with multiple independent internal voltage regulators to enable operation using per core P-states (PCPS).

If it is determined that the one or more threads of a given performance domain are executing on a low power core, control passes to block 320 where such thread can be migrated to one or more large cores. Otherwise, the method may conclude.

Referring still to FIG. 3, if the determination at diamond 310 indicates that the requested P-state does not exceed the threshold performance state, control passes to diamond 325 where it can be determined whether one or more threads within this performance domain are executing on large cores. If so, control passes to block 330 where these threads can be migrated to low power cores. In accordance with various embodiments, this context switch can be transparent to the OS. In general operations to perform dynamic migration constitute saving a state of the executing core and providing at least that portion of the state for use in the process to the identified other core type. If these threads are not operating on such large cores as determined at diamond 325, method 300 may directly conclude. Although shown at this high level in the embodiment of FIG. 3, understand the scope of the present invention is not limited in this regard. For example migrations may be affected and (possibly limited) by thermal state as described more fully below.

In some embodiments prior to the context switch of threads between different cores, it may also be determined whether a given process has been switched between the cores greater than a threshold number of times. If this count value exceeds a threshold, this indicates that for some reason the process continues to be switched back to the large core from the small core (e.g., for execution of instructions of the code not supported by the small core). The control switch threshold can be changed dynamically based on the system power and performance requirement and the expectation for better or less power/performance efficiency. Accordingly, the overhead incurred in performing the migration may not be worth the effort and thus, a process migration may not occur.

In other embodiments, a task controller may cause dynamic migration between cores based on performance monitor information received in the TCU from one more cores of the processor. Although this dynamic migration control can be based solely on this performance monitor information, in some embodiments combinations of control may occur based on this performance monitor information and P-state information from the OS.

Figure 4:
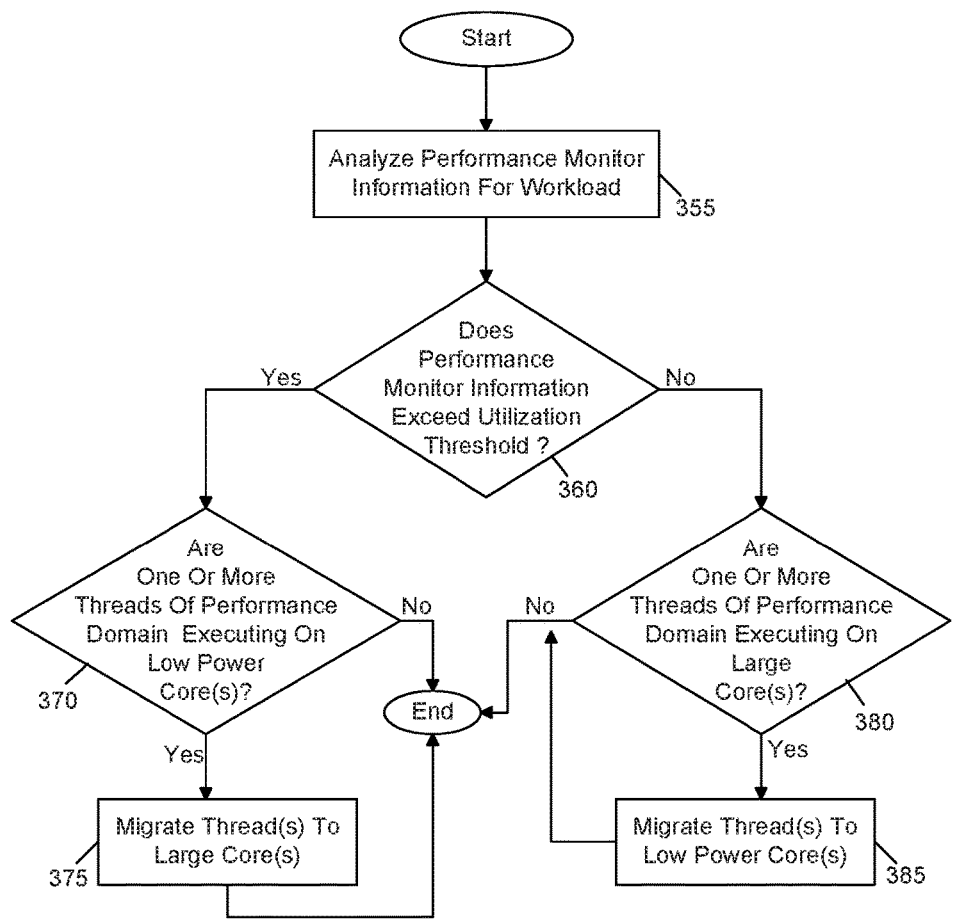
FIG. 4 is a flow diagram a method for dynamically migrating threads in accordance with another embodiment of the present invention.

Referring now to FIG. 4, shown is a flow diagram a method for dynamically migrating threads between cores based on performance monitor information. As seen in FIG. 4, method 350, which may be implemented in a TCU of a processor, can begin by analyzing performance monitor information for a workload being executed in a given performance domain (block 355). In one embodiment, performance monitoring information can be received from each of multiple performances domains, and can be analyzed on a per domain basis. However, in other implementations performance monitoring information can be received from multiple domains and analyzed globally. Although the scope of the present invention is not limited this regard in some embodiments this performance monitoring information may include information received from performance monitoring units of the multiple cores and may correspond to IPC information, cache statistics, execution performance or so forth.

Referring still to FIG. 4, at diamond 360 it can be determined whether the performance monitor information exceeds a utilization threshold. As an example, such utilization thresholds can correspond to a given processor utilization value.

If it is determined that the performance monitor information exceeds this utilization threshold, control passes to diamond 370 where it can be determined whether one or more threads of the performance domain are executing on low power cores. If so, control passes to block 375 where the threads can be migrated to large cores. If not, the method may conclude.

Still referring to FIG. 4, if at diamond 360 it is determined that the performance monitor information does not exceed the utilization threshold, control passes to diamond 380 where it can be determined whether one or more threads of this performance domain are executing on large cores. If so, control passes to block 385, where the thread can be migrated to a low power core.

On top of the performance metric(s) that can be used by the TCU to decide which type of core is to be used, the TCU is also aware of the current physical constraints like thermal or power budgets that may limit the amount of time that it is possible to use the large core, and to migrate code from the large core to the small core even if the performance metric(s) still justify working on the large core. Also the reverse dynamic change in constraints above may trigger a switch from the small core to the large core during the run time of the executed code.

Note that the operations to dynamically migrate cores based on performance state request updates and/or performance monitoring information can occur in an AMP that includes equal numbers of large and small cores so that if an ISA exception occurs due to a given type of core not supporting a certain instruction, an available core is present to handle a migration due to a fault.

Nevertheless an AMP processor can be implemented without having equal numbers of large and small core pairs. In such embodiments, dynamic migrations may occur when a processor to be operated in a turbo range, namely above a maximum guaranteed operating frequency where the hardware is not obliged to meet an OS performance request; rather it simply tries to honor the request. In such implementations threads that are most likely to gain from switching to a larger, higher power core may be migrated based on the amount of such cores available. It is possible in other implementations that fewer small cores than large cores may be present, with operation generally in the inverse than the described turbo flow.

Figure 5:
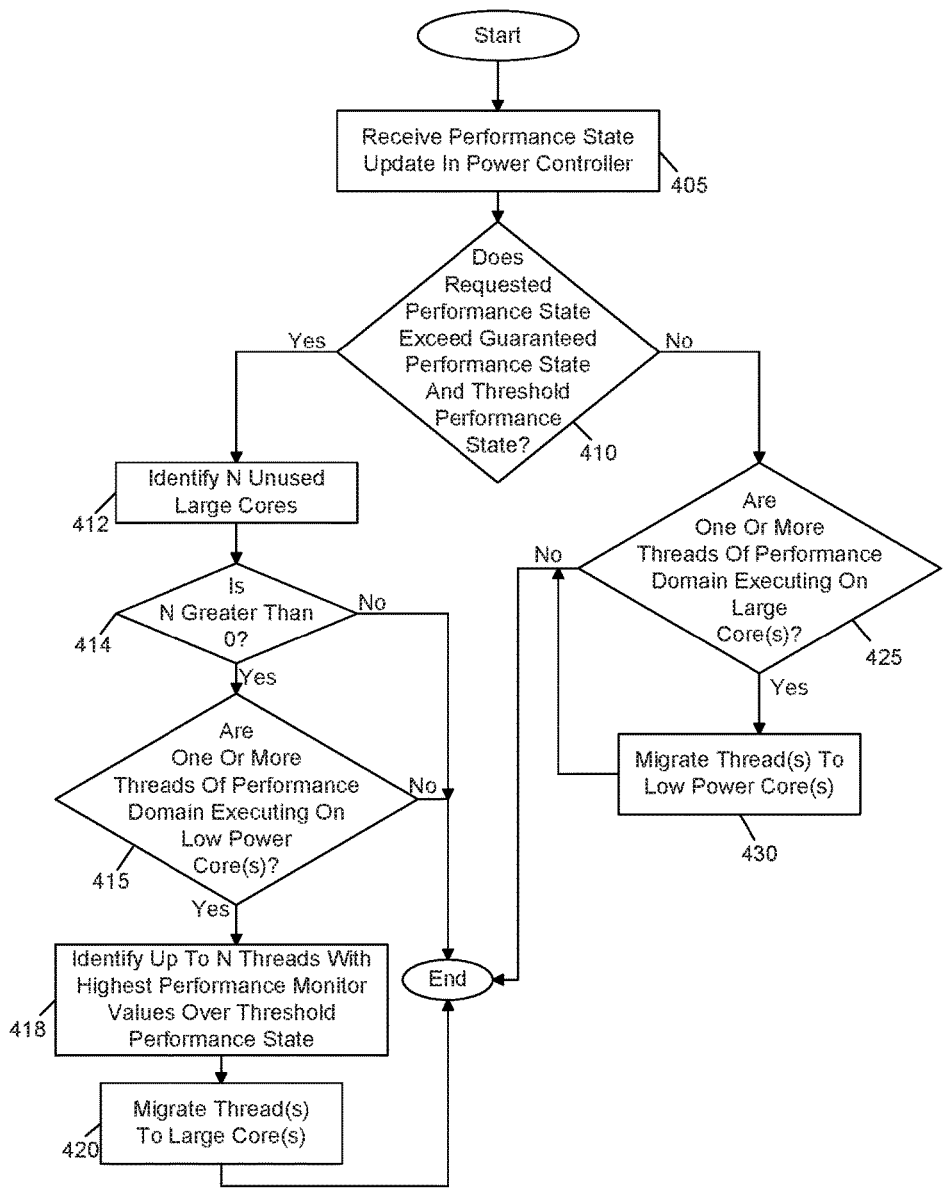
FIG. 5 is a flow diagram of a method for dynamically migrating threads between cores in accordance with a still further embodiment of the present invention.

Referring now to FIG. 5, shown is a flow diagram of a method for dynamically migrating between cores in the context of an AMP having asymmetric numbers of small and large cores.

In one embodiment, method 400 may be implemented by migration logic within a TCU to dynamically control migration of one or more threads between different core types and when the numbers of the first and second types of cores (e.g., large and small) are asymmetrical. As with method 300 described above in FIG. 3, migration may be based on performance state updates received in the TCU. As seen, method 400 may begin by receiving a P-state update in a power control unit (block 405).

Still referring to FIG. 5, control passes to diamond 410 where it can be determined whether the requested performance state exceeds a threshold performance state and further whether the requested performance state exceeds a guaranteed performance state. In various embodiments, this guaranteed performance state may correspond to a P0 performance state. Although the scope of the present invention is not limited in this regard, in one embodiment the threshold performance state may correspond to at least one performance bin greater than the guaranteed performance state. If a higher state is requested, the determination is in the affirmative and accordingly, control passes to block 412. There the number of available (e.g., unused) large cores can be identified. Next control passes to diamond 414, where it can be determined whether this number N is greater than zero. If not, there are no available large cores, and accordingly a dynamic migration does not occur and thus the method may conclude. Otherwise if N is greater than zero, control passes to diamond 415.

At diamond 415 it can be determined whether one or more threads within a performance domain are executing on a low power core, which may be done on a per performance domain basis.

If it is determined that the one or more threads of a given performance domain are executing on a low power core, control passes to block 418 where up to N threads having highest performance monitor values greater than a threshold performance state can be identified. In one embodiment, the performance monitor values may correspond to utilization values, although other metrics are equally appropriate, such as instructions per cycle. Control next passes to block 420 where such threads can be migrated to one or more of the available large cores.

Referring still to FIG. 5, if the determination at diamond 410 indicates that the requested P-state does not exceed the threshold performance state, control passes to diamond 425 where it can be determined whether one or more threads within this performance domain are executing on large cores. If so, control passes to block 430 where these threads can be migrated to low power cores. In accordance with various embodiments, this context switch can be transparent to the OS, as described above. If these threads are not operating on such large cores, method 400 may directly conclude. Although shown at this high level in the embodiment of FIG. 5, understand the scope of the present invention is not limited in this regard.

Figure 6:
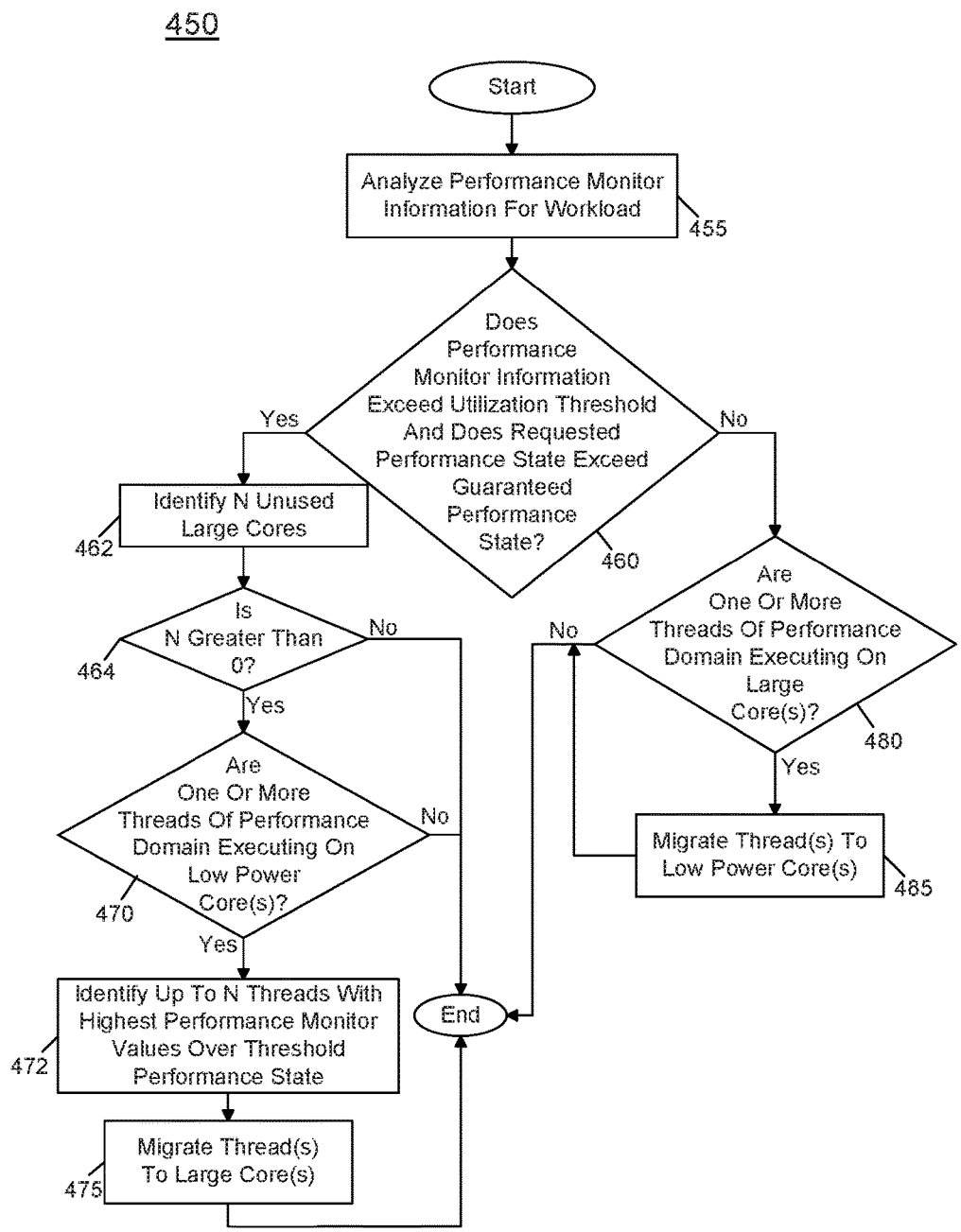
FIG. 6 is a flow diagram of a method for dynamically migrating threads between cores in accordance with yet another embodiment of the present invention.

Referring now to FIG. 6, shown is a flow diagram a method for dynamically migrating threads between cores based on performance monitor information for the case of asymmetric numbers of heterogeneous cores. As seen in FIG. 6, method 450, which may be implemented in a TCU of a processor, can begin by analyzing performance monitor information for a workload being executed in a given performance domain (block 455).

Referring still to FIG. 6, at diamond 460 it can be determined whether the performance monitor information exceeds a utilization threshold and whether the requested performance state exceeds a guaranteed (e.g., P0) performance state. If it is determined that the performance monitor information exceeds this utilization threshold and a higher than guaranteed performance state is requested, control passes to block 462 where the number N of unused large cores can be identified. Control next passes to diamond 464 where it can be determined whether this number N is greater than zero. If not, no dynamic migration is possible and thus the method may conclude.

Otherwise, control passes to diamond 470 where it can be determined whether one or more threads of the performance domain are executing on low power cores. If so, control passes to block 472, where up to N threads having the highest performance monitor values over a threshold performance state can be identified. Then control passes to block 475 where these threads can be migrated to large cores. If not, the method may conclude. Still referring to FIG. 6, if at diamond 460 it is determined that the performance monitor information does not exceed the utilization threshold, control passes to diamond 480 where it can be determined whether one or more threads of this performance domain are executing on large cores. If so, control passes to block 485, where the thread can be migrated to a low power core.

Figure 7:
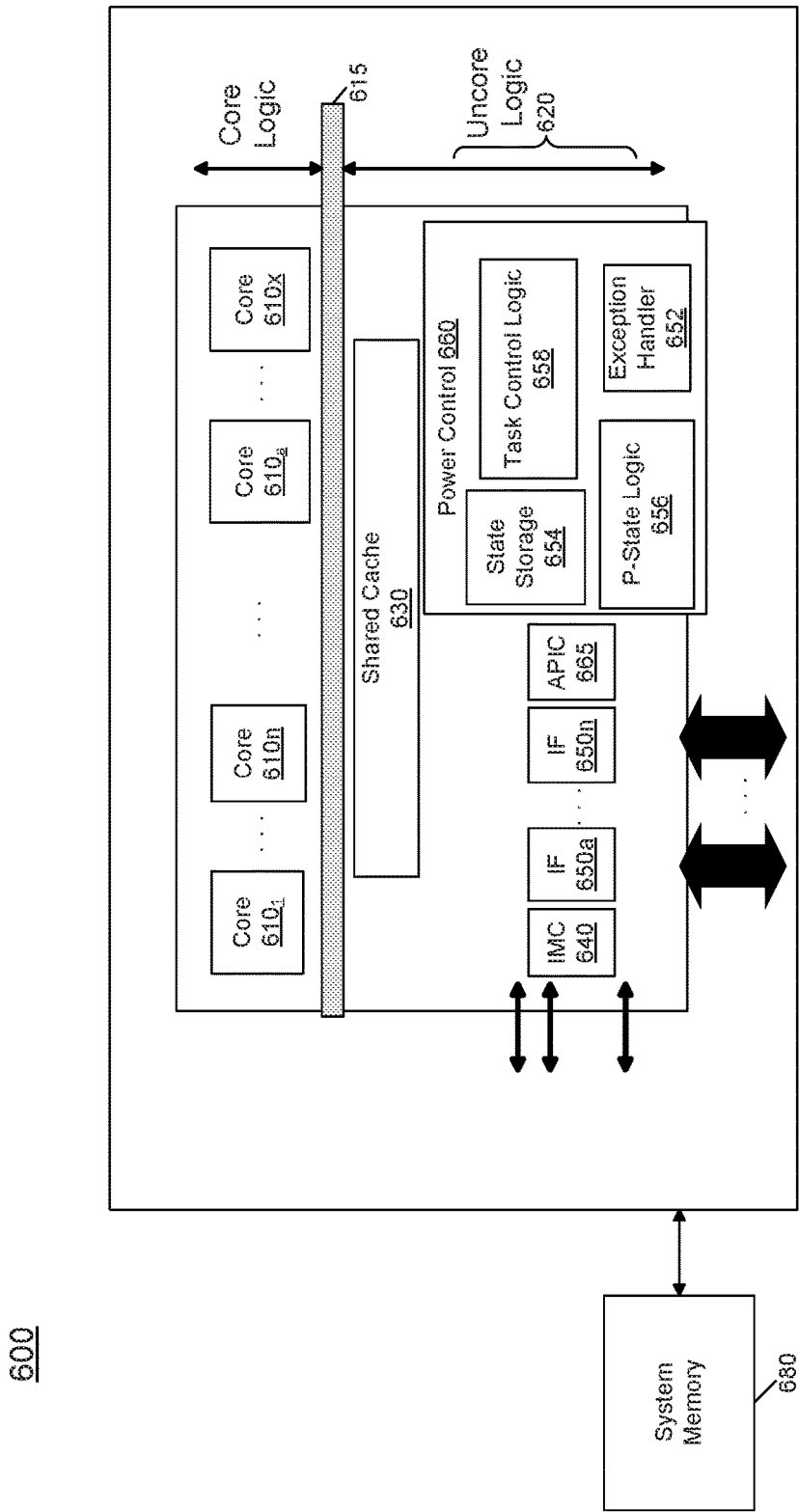
FIG. 7 is a block diagram of a processor in accordance with another embodiment of the present invention.

Referring now to FIG. 7, shown is a block diagram of a processor in accordance with another embodiment of the present invention. As shown in FIG. 7, processor 600 may be a multicore processor including a first plurality of cores 610$_1$-610$_n$ that can be exposed to an OS, and a second plurality of cores 610$a$-$x$ that are transparent to the OS. In various embodiments, these different groups of cores can be of heterogeneous size, performance, power, and other capabilities, and understand that these transparent cores can be the larger or smaller cores depending on the embodiment.

As seen, the various cores may be coupled via an interconnect 615 to a system agent or uncore 620 that includes various components. As seen, the uncore 620 may include a shared cache 630 which may be a last level cache. In addition, the uncore may include an integrated memory controller 640, various interfaces 650$a$-$n$, an advanced programmable interrupt controller (APIC) 665, and a power control unit 660. Note that the shared cache may or may not be shared between the different core types in various embodiments.

As further seen in FIG. 7, power control unit 660 can include various logic units and storages. In the embodiment shown, power control unit 660 can include an exception handler 652 that can be configured to receive and handle via hardware exceptions occurring on cores and/or other components that are transparent to an OS. In this way, this handler can respond to interrupts such as invalid opcode exceptions without OS support. In addition, power control unit 660 can include a state storage 654 that can be used to store the architectural state (and micro-architectural state) of large and small cores for purposes of context switches, including maintaining state of a large core that is not transferred to a small core on a context switch. Still further, power control unit 660 can include a task control logic 658 to determine whether a given process should be migrated between heterogeneous core types. Power control logic 660 may further include a P-state logic 656, which can receive incoming P-state requests from an OS and determine an appropriate operating frequency for all or portions of the processor based on such requests, e.g., taking into account other constraints on the processor such as thermal, power and so forth. P-state logic 656 may provide information regarding these determined P-states to task control logic 658.

Although shown with this particular logic in the embodiment of FIG. 7, understand the scope of the present invention is not limited in this regard. For example, the various logics of power control unit 660 can be implemented in a single logic block in other embodiments.

APIC 665 may receive various interrupts and direct the interrupts as appropriate to a given one or more cores. In some embodiments, to maintain the small cores as hidden to the OS, power control unit 660, via APIC 665 may dynamically remap incoming interrupts, each of which may include an APIC identifier associated with it, from an APIC ID associated with a large core to an APIC ID associated with a small core. The assumption is that the APIC ID that was allocated for the core type that was visible to the operating system during boot time is migrated between the core types as part of the core type switch.

With further reference to FIG. 7, processor 600 may communicate with a system memory 680, e.g., via a memory bus. In addition, by interfaces 650, connection can be made to various off-chip components such as peripheral devices, mass storage and so forth. While shown with this particular implementation in the embodiment of FIG. 7, the scope of the present invention is not limited in this regard. For example, in some embodiments a processor such as shown in FIG. 7 can further include an integrated graphics engine, which may be of a separate graphics domain.

Figure 8:
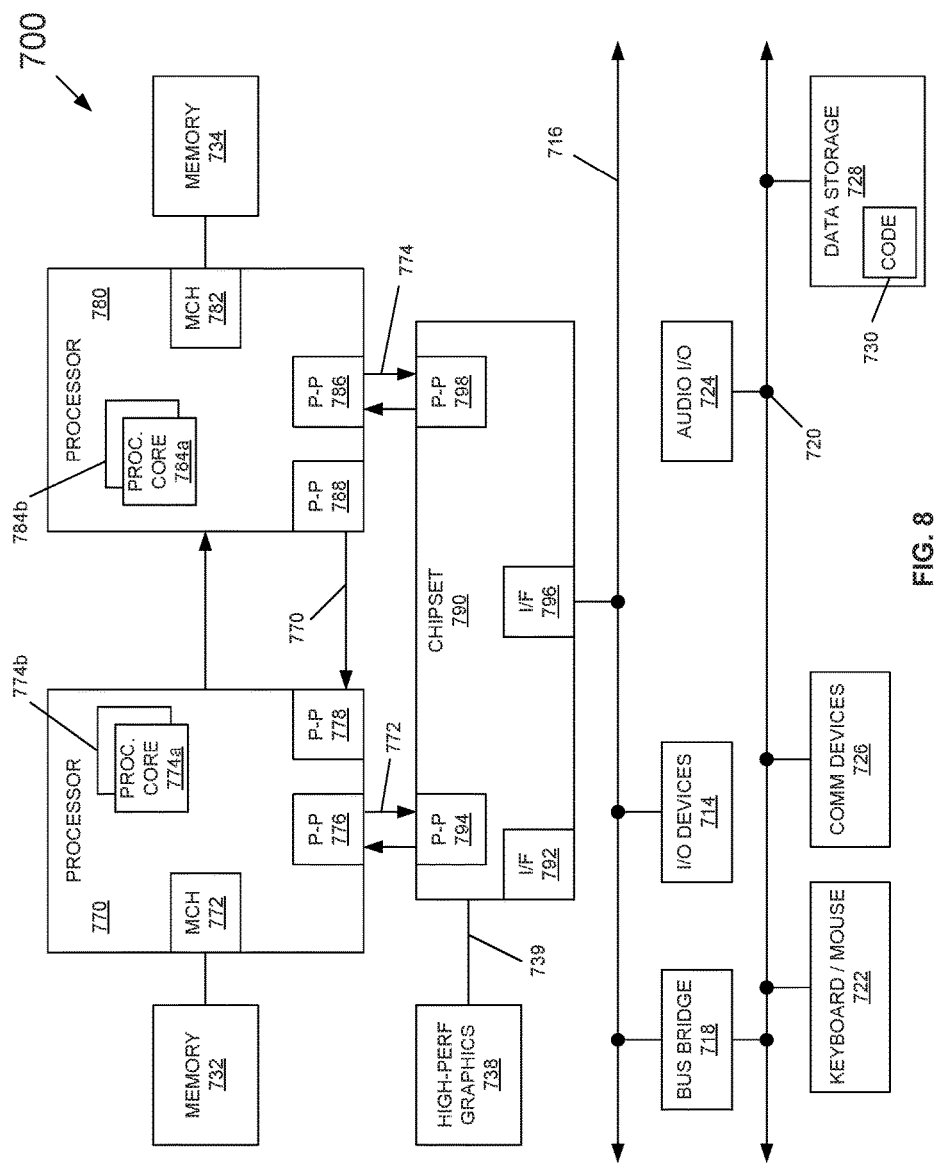
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774a and 774b and processor cores 784a and 784b) each of which can be heterogeneous cores, although potentially many more cores may be present in the processors. Each of the processors can include a power control unit and a task control unit or other logic to perform context switches in a transparent manner to an OS, as described herein.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. However, in other embodiments, graphics engine 738 can be internal to one or both of processors 770 and 780. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smartphone, tablet computer, Ultrabook™, netbook, or so forth.

In the above embodiments, it is assumed that the heterogeneous cores are of the same ISA or possibly of a reduced set of instructions of the same ISA. For example, with reference back to FIG. 1, it can be assumed that both large cores 125 and small cores 130 may be of an x86 architecture. For example, the large cores 125 may correspond to cores having a micro-architecture of an Intel™ Core™ design and the small cores 130 can be of an Intel™ Atom™ design. However understand the scope of the present invention is not limited in this regard and in other embodiments, an AMP processor can include cores of a different design such as ARM-based cores available from ARM Holdings of Sunnyvale, Calif. For example, the large cores may correspond to a Cortex™ A15 design, while the small cores can be of a Cortex™ A7 design. Or an AMP processor may include MIPS-based cores available from MIPS Technologies of Sunnyvale, Calif. Furthermore, as will be described below, embodiments can mix cores of different vendors/licensors and/or ISAs such as cores according to an x86 ISA and cores according to an ARM-based ISA.

Figure 9:
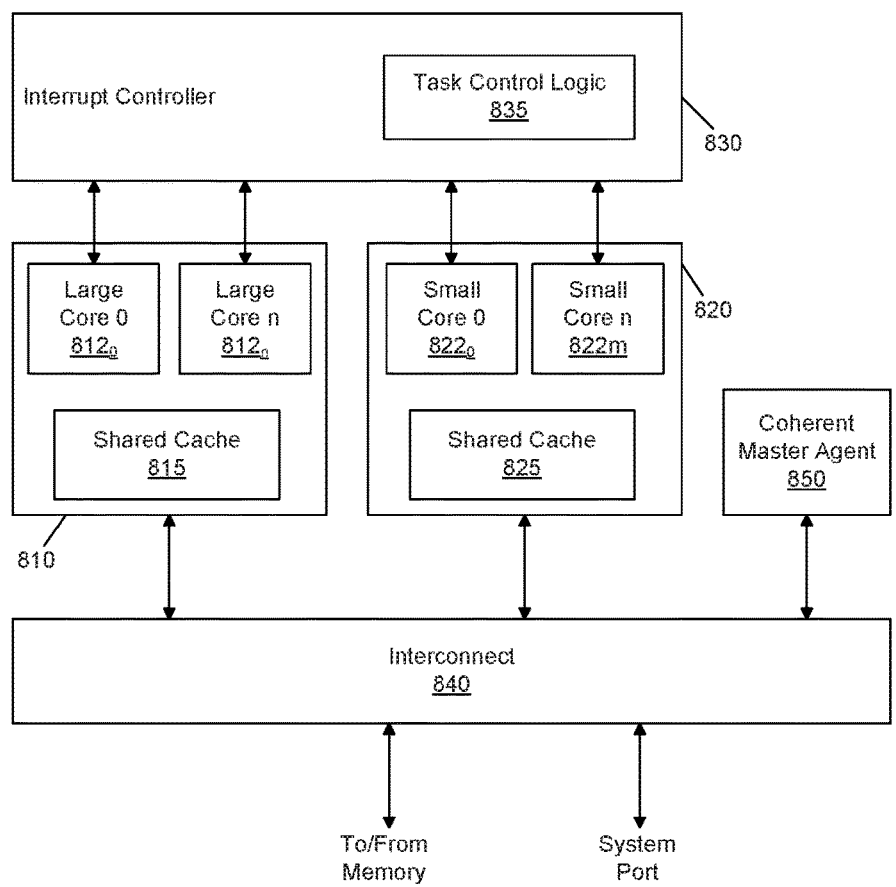
FIG. 9 is a block diagram of a processor in accordance with another embodiment of the present invention.

Referring now to FIG. 9, shown is a block diagram of a processor 800 in accordance with another embodiment of the present invention. In one embodiment, processor 800 may correspond to a system-on-a-chip (SoC) that can be implemented using heterogeneous cores of a reduced instruction set computing (RISC) ISA. As an example, these cores can be ARM-based cores having heterogeneous resources. As seen in FIG. 9, processor 800 includes a first processor cluster 810 and a second processor cluster 820. First processor cluster 810 may include a plurality of large cores $812_0$-$812_n$. As seen, each of these cores may be coupled to a shared cache memory 815, which in one embodiment may be a level 2 (L2) cache memory. Each of large cores 812 may be of an out-of-order architecture. Second processor cluster 810 may include a plurality of small cores $822_0$-$822_m$. As seen, each of these cores may be coupled to a shared cache memory 825, which in one embodiment may be a L2 cache memory. Each of small cores 822 may be of an in-order architecture.

First processor cluster 810 and second processor cluster 820 may be coupled via one or more interrupt channels to an interrupt controller 830 that may process interrupts received from the various cores. As seen, interrupt controller 830 may include a task control logic 835 in accordance with an embodiment of the present invention to enable transparent migration of tasks between the different processor clusters. As further seen, each processor cluster can be coupled to an interconnect 840 which in an embodiment can be a cache coherent interconnect that further communicates with an input/output coherent master agent 850. As seen, interconnect 840 also may communicate off-chip, e.g., to and from a DRAM as well as to provide for communication with other components via a system port. Although shown with this particular implementation in the embodiment of FIG. 9, understand the scope of the present invention is not limited in this regard.

As mentioned above, it is also possible to mix cores of different vendors. For example, x86-based cores can be provided on a single die along with ARM-based cores. And with such an architecture, embodiments provide for dynamic migration of processes between these different types of cores transparently to an OS.

Figure 10:
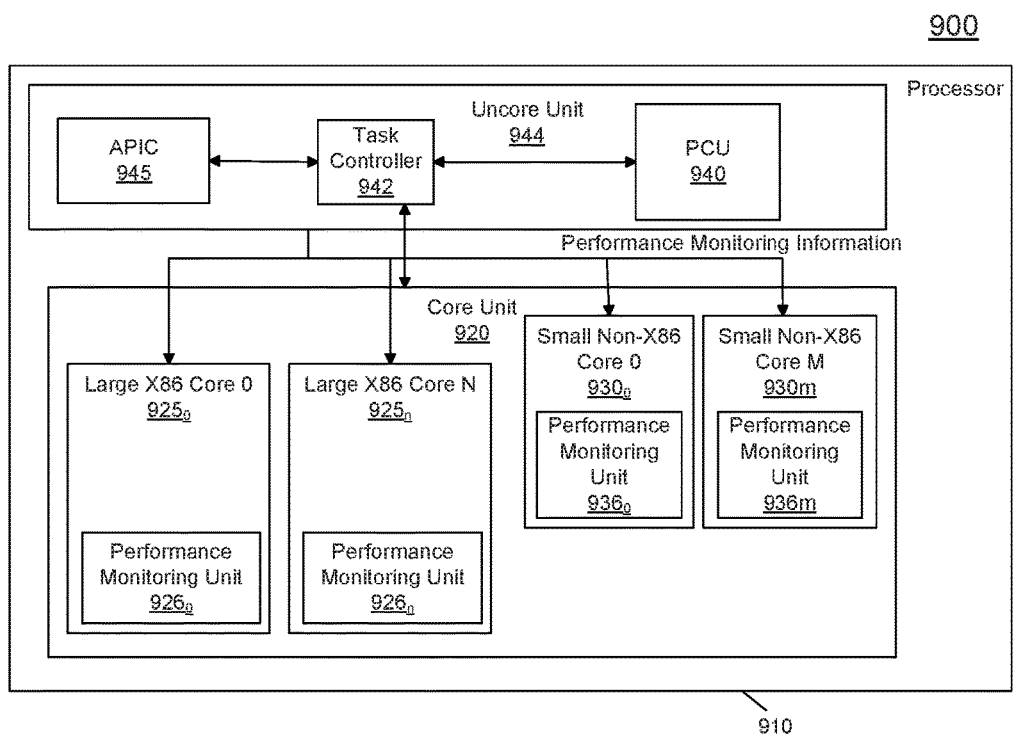
FIG. 10 is a block diagram of a processor in accordance with another embodiment of the present invention.

Referring now to FIG. 10, shown is a block diagram of a processor in accordance with another embodiment of the present invention. As shown in FIG. 10, processor 900 can be a multicore processor that includes a core unit 920 having heterogeneous resources. Specifically in the embodiment of FIG. 1, different types of hardware or physical cores can be present, including a plurality of large cores 925$_0$-925$_n$ (generically large core 925), and a plurality of small cores 930$_0$-930$_m$ (generically small core 930) (note that different numbers of large and small cores may be present). In the embodiment of FIG. 10, different micro-architectures are present, including large cores 925 that may be of an x86 architecture and small cores 930 that may be of an ARM, MIPS or other architecture. As examples, the large cores may be of an Intel™ Core™ design and the small cores may be of an ARM Cortex™ design. However, in other embodiments the large cores may be ARM-based and the small cores may be x86-based.

As further seen in FIG. 10, processor 910 further includes an uncore unit 944 having a power controller or PCU 940. PCU 940 may receive requests to change P-state of a core. In turn responsive to this request, the PCU can communicate a performance state with a TCU 942. As further seen, TCU 942 may further receive additional information such as performance monitoring information from performance monitors 926$_0$-926$_n$ and 936$_0$-936$_m$ of the cores. TCU 942 can trigger an asynchronous interrupt to enable an OS transparent migration between different core types based on this information.

FIG. 10 also shows the presence of APIC 945 that may receive various incoming interrupts, both from the OS as well as hardware-based interrupts and map such interrupts to a requested core. Furthermore, in accordance with an embodiment of the present invention, dynamic remapping can occur based on control from TCU 942 such that the TCU can dynamically migrate threads between the asymmetric cores transparently to the OS.

Embodiments thus hide physical heterogeneity from the OS and enable taking advantage of heterogeneity without the need for OS support.

The following examples pertain to further embodiments. In one aspect, a multicore processor includes first and second cores to independently execute instructions, where the first core is visible to an OS and the second core is transparent to the OS and heterogeneous from the first core. The processor may further include a task controller coupled to the first and second cores to dynamically migrate a first process scheduled by the OS to the first core to the second core, where this dynamic migration is transparent to the OS. The task controller can dynamically migrate the first process based at least in part on a performance state request received in a power controller from the OS, and can dynamically migrate the first process further based on performance monitor information obtained during execution of the first process on the first core.

In one aspect, the first core is of a first ISA, and the second core is of a second ISA, and where the second core includes an emulation engine to emulate an instruction of the first ISA that is not included in the second ISA. Multiple first cores and second cores may be included, where a number of the first cores is asymmetric to a number of the second cores. A first performance domain may include at least one of the first cores, and the task controller is to dynamically migrate the first process from the first core to the second core based at least in part on a performance state request received in a power controller from the OS corresponding to the first performance domain, and to thereafter dynamically migrate the first process from the second core to the first core based on performance monitor information obtained during execution of the first process on the second core.

The task controller can dynamically migrate N processes each from one of the second cores to one of the first cores, when there are at least N unutilized cores of the plurality of first cores. The N processes may be of X processes executing on the second cores, where X is greater than N and the N processes each have a higher utilization value than the remaining X–N processes.

An exception handling unit can handle an exception occurring during execution of the process on the second core transparently to the OS. The task controller may include a first counter to count a number of times the first process has been switched between the first and second cores, and prevent migration of the first process from the first core to the second core when a value of the first counter is greater than a first threshold.

Another aspect includes a method for receiving a performance state update from an OS in a task controller of a multicore processor including a first plurality of cores and a second plurality of cores, the first plurality of cores visible to the OS and the second plurality of cores transparent to the OS and heterogeneous from the first plurality of cores. The performance state update can request at least one of the first plurality of cores to operate at a requested performance state. Then it can be determined whether the requested performance state exceeds a guaranteed performance state and a threshold performance state and if so, transparently to the OS, at least one thread is migrated from at least one of the second plurality of cores to at least one of the first plurality of cores, where the OS allocated the at least one thread to one of the first plurality of cores.

In addition, it can be determined whether the at least one thread has switched between the first and second plurality of cores greater than a threshold number of times and if so, the at least one thread can be maintained on the first plurality of cores. N unused ones of the first plurality of cores and up to N threads executing on the second plurality of cores with highest performance monitor values over a threshold performance monitor value can be identified, and the N threads can be migrated from the second plurality of cores to the first plurality of cores, while at least one thread is not migrated from the second plurality of cores to the first plurality of cores while migrating the N threads.

Another aspect includes a system with a multicore processor including a first plurality of cores and a second plurality of cores executing in a plurality of performance domains, where the second plurality of cores heterogeneous to the first plurality of cores and transparent to an OS. A power controller can receive a performance state update from the OS for a first performance domain of the plurality of performance domains and performance monitor information from the first and second plurality of cores and cause a context switch to dynamically migrate a process from execution on a second core of the second plurality of cores to a first core of the first plurality of cores transparently to the OS, based on the performance state update and the performance monitor information. A dynamic random access memory (DRAM) may be coupled to the multicore processor. The second core can include an emulation logic to emulate an instruction of a first ISA, where the second core of a different ISA than the first ISA. A number of the first plurality of cores may be different than a number of the second plurality of cores.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A multicore processor comprising:
   a first core to execute instructions independently from other cores;
   a second core to execute instructions independently from other cores, the first core visible to an operating system (OS) adapted for a symmetric processor and the second core transparent to the OS and heterogeneous from the first core, the multicore processor comprising an asymmetric processor;
   a hardware task controller coupled to the first and second cores to dynamically migrate a first process, scheduled by the OS to a first virtual core associated with the first core via an allocation of the first process to the first core based on a mapping table having an association between a first identifier sent from the OS to the first core, to the second core, where the dynamic migration is transparent to the OS; and
   a hardware power controller coupled to the hardware task controller and the first and second cores and to receive a performance state request for the first core from the OS and communicate the performance state request to the hardware task controller, wherein the hardware task controller is to dynamically migrate the first process based at least in part on the performance state request for the first core received in the hardware task controller from the hardware power controller and performance monitor information received in the hardware task controller from the first core during execution of the first process on the first core, via an update to the mapping table to associate the first identifier with the second core, wherein the hardware task controller is to prevent the dynamic migration of the first process to the second core when a number of switches of the first process between the first core and the second core exceeds a threshold number of switches and enable the dynamic migration of the first process when the number of switches is less than the threshold number of switches.

2. The multicore processor of claim 1, wherein the first core is of a first instruction set architecture (ISA), and the second core is of a second ISA.

3. The multicore processor of claim 2, wherein the second core includes an emulation engine to emulate an instruction of the first ISA that is not included in the second ISA.

4. The multicore processor of claim 1, further comprising a plurality of first cores including the first core and a plurality of second cores including the second core, wherein a number of the plurality of first cores is asymmetric to a number of the plurality of second cores.

5. The multicore processor of claim 4, further comprising a first performance domain including at least one of the plurality of first cores, wherein the hardware task controller is to dynamically migrate the first process from the first core to the second core based at least in part on a performance state request received in the hardware power controller from the OS corresponding to the first performance domain.

6. The multicore processor of claim 5, wherein the hardware task controller is to thereafter dynamically migrate the first process from the second core to the first core based on performance monitor information obtained during execution of the first process on the second core.

7. The multicore processor of claim 4, wherein the hardware task controller is to dynamically migrate N processes each from one of the plurality of second cores to one of the plurality of first cores, when there are at least N unutilized cores of the plurality of first cores.

8. The multicore processor of claim 7, wherein the N processes are of a plurality of X processes in execution on the plurality of second cores, X greater than N and wherein the N processes each have a higher utilization value than the remaining X−N processes.

9. The multicore processor of claim 1, further comprising an exception handling unit to handle an exception occurring during execution of the first process on the second core transparently to the OS.

10. The multicore processor of claim 1, wherein the second core is of a different instruction set architecture (ISA) than the first core, and the different ISA is partially overlapping with an ISA of the first core.

11. The multicore processor of claim 1, wherein the hardware task controller is to dynamically migrate the first process further based on a detection that the performance state request exceeds a guaranteed performance state and a threshold performance state.

12. The multicore processor of claim 11, wherein the threshold performance state exceeds the guaranteed performance state by at least one performance bin.

13. A method comprising:
   receiving a performance state update from an operating system (OS) in a controller of a multicore processor including a first plurality of cores and a second plurality of cores, the first plurality of cores visible to the OS and the second plurality of cores transparent to the OS and heterogeneous from the first plurality of cores, wherein the performance state update requests at least one of the first plurality of cores to operate at a requested performance state;
   determining that the requested performance state exceeds a guaranteed performance state and a threshold performance state exceeding the guaranteed performance state, the threshold performance state at least one performance state greater than the guaranteed performance state;

maintaining a count of a number of switches of at least one thread between the first plurality of cores and the second plurality of cores;

responsive to determining that the requested performance state exceeds the guaranteed performance state and the threshold performance state, migrating, transparently to the OS, the at least one thread from at least one of the second plurality of cores to at least one of the first plurality of cores, wherein the OS allocated the at least one thread to one of the first plurality of cores, when the count of the number of switches of the at least one thread between the first plurality of cores and the second plurality of cores is not greater than a threshold number of times; and maintaining the at least one thread on the second plurality of cores responsive to determining that the count of the number of switches of the at least one thread between the first plurality of cores and the second plurality of cores is greater than the threshold number of times.

14. The method of claim 13, further comprising identifying N unused ones of the first plurality of cores and identifying up to N threads executing on the second plurality of cores with highest performance monitor values over a threshold performance monitor value.

15. The method of claim 14, further comprising migrating the N threads from the second plurality of cores to the first plurality of cores.

16. The method of claim 13, wherein the second plurality of cores is of a different instruction set architecture (ISA) than the first plurality of cores, and the different ISA is partially overlapping with an ISA of the first plurality of cores.

17. A system comprising:

a multicore processor including a first plurality of cores and a second plurality of cores to execute in a plurality of performance domains, the second plurality of cores heterogeneous to the first plurality of cores and transparent to an operating system (OS), and a power controller, wherein the power controller is to receive a performance state update from the OS for a first performance domain of the plurality of performance domains and performance monitor information from the first and second plurality of cores and to cause a context switch to dynamically migrate a process from execution on a second core of the second plurality of cores to a first core of the first plurality of cores transparently to the OS, based on the performance state update and the performance monitor information, wherein the second plurality of cores is of a different instruction set architecture (ISA) than the first plurality of cores, and the different ISA is partially overlapping with an ISA of the first plurality of cores and the power controller includes a counter to count a number of switches of the process between the first and second cores, wherein the power controller is to prevent the dynamic migration of the process between the first core and the second core when the number of switches exceeds a threshold number of switches and enable the dynamic migration of the process when the number of switches is less than the threshold number of switches; and a dynamic random access memory (DRAM) coupled to the multicore processor.

18. The system of claim 17, wherein the second core includes an emulation logic to emulate an instruction of a first instruction set architecture (ISA), the second core of a different ISA than the first ISA.

19. The system of claim 17, wherein a number of the first plurality of cores is different than a number of the second plurality of cores.

* * * * *